United States Patent [19]
Atkinson

[11] 3,805,684
[45] Apr. 23, 1974

[54] MOTOR VEHICLE BODY VENTILATION

[75] Inventor: Ward J. Atkinson, Northville, Mich.

[73] Assignee: General Motors Corporation, Detroit, Mich.

[22] Filed: Oct. 12, 1971

[21] Appl. No.: 188,379

Related U.S. Application Data

[63] Continuation-in-part of Ser. No. 93,142, Nov. 27, 1970, abandoned.

[52] U.S. Cl. .................................. 98/2.18
[51] Int. Cl. ................................. B60h 1/24
[58] Field of Search ...................... 98/2.18, 2.11

[56] References Cited
UNITED STATES PATENTS

| | | | |
|---|---|---|---|
| 3,195,440 | 7/1965 | Coscione | 98/2 |
| 3,391,628 | 7/1968 | Ziegenfelder | 98/2 |
| 3,259,051 | 7/1966 | Boche | 98/2.18 |
| 3,392,654 | 7/1968 | Grenier | 98/2.18 |
| 3,513,764 | 5/1970 | Stoker | 98/2.18 |

Primary Examiner—Meyer Perlin
Attorney, Agent, or Firm—P. A. Taucher

[57] ABSTRACT

The invention relates to a ventilation system and, more particularly, to a ventilation system for use in passenger compartments of motor vehicles and includes an air admission means, such as a heater or air conditioner, or ventilation means for introducing air under pressure by fan or ram air means into the passenger compartment. The ventilation system of my invention reduces positive and negative pressures within the passenger compartment of such a vehicle by air flow through a continuously open and unobstructed or uninhibited air passage between the passenger compartment and an opening in the side of the vehicle body, with the opening being located in a substantially neutral pressure area on the vehicle's side. Air flows through the passage in either direction, dependent upon the air pressure in the passenger compartment, to effectively maintain the passenger compartment at a neutral pressure to prevent noise and obtain maximum efficiency of the air admission means.

1 Claim, 4 Drawing Figures

| POINT | MPH | | |
|---|---|---|---|
| | 50 | 70 | 90 |
| 1 | 1.3 | 2.6 | 3.9 |
| 2 | 1.2 | 1.8 | 3.2 |
| 3 | -.4 | -.8 | -2.2 |
| 4 | -.4 | -.95 | -2.1 |
| 5 | -.2 | -.45 | -1.25 |
| 6 | -.5 | -1.15 | -2.1 |
| 7 | -.2 | -.5 | -1.15 |
| 8 | -.1 | -.3 | -.9 |
| 9 | -.45 | -1.1 | -2.4 |
| 10 | -.12 | -.3 | -.8 |
| 11 | -.2 | -.4 | -1.15 |

PRESSURE INCHES H2O

INVENTOR.
Ward J. Atkinson
BY
P. A. Taucher
ATTORNEY

MOTOR VEHICLE BODY VENTILATION

This is a continuation-in-part of application Ser. No. 93,142, filed Nov. 27, 1970, now abandoned in the name of Ward J. Atkinson, and assigned to the assignee of this application.

This invention relates to a motor vehicle ventilation system having an uninhibited air passage between the exterior of the vehicle and the passenger compartment for conducting air flow in either direction between the passenger compartment and the vehicle's exterior.

An object of the present invention is to provide a vehicle ventilation system that prevents build-up of excessive positive pressure in a vehicle passenger compartment when the vehicle windows are closed.

Another object is to provide a ventilation system that reduces the level of negative pressure in the vehicle passenger compartment during movement of the vehicle having the windows open.

A further object of the invention is to provide a ventilation system which reduces positive and negative pressures within the passenger compartment of such a vehicle by air flow through a continuously open and unobstructed or uninhibited air passageway between the passenger compartment and an opening in the side of the vehicle body, with the opening being located in a substantially neutral pressure area on the vehicle. Air flow through the passage is in either direction, dependent upon the air pressure in the passenger compartment as produced by the combination of: an air admission system including heater ducts, air conditioning ducts and outside air vents, and the position of the vehicle windows being open, closed, or partially open.

Further objects and advantages of the present invention will be apparent from the following detailed description, reference being had to the accompanying drawings wherein a preferred embodiment of the present invention is clearly shown.

Figure 1:
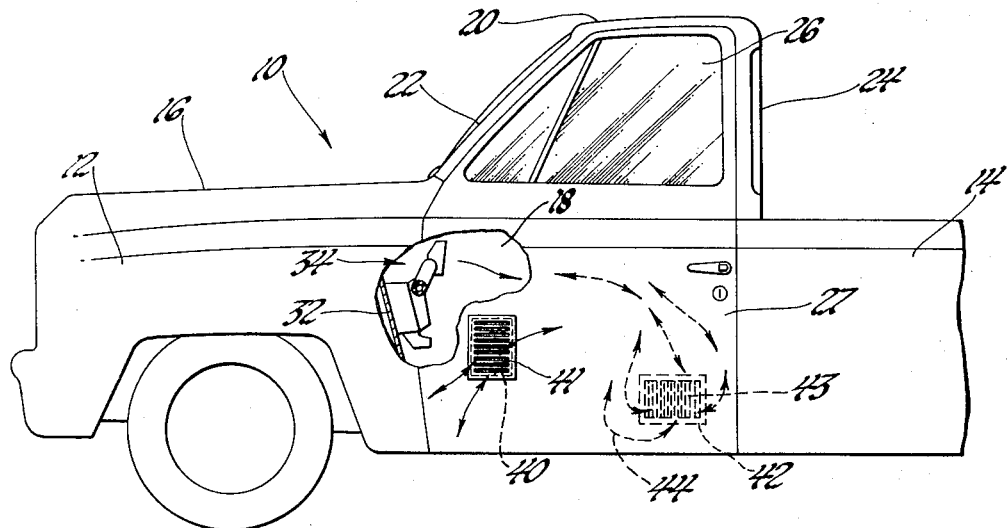
FIG. 1 is a vertical side view of a motor vehicle, in this case a truck, broken away to reveal the air admission means in the passenger compartment.
Figure 2:
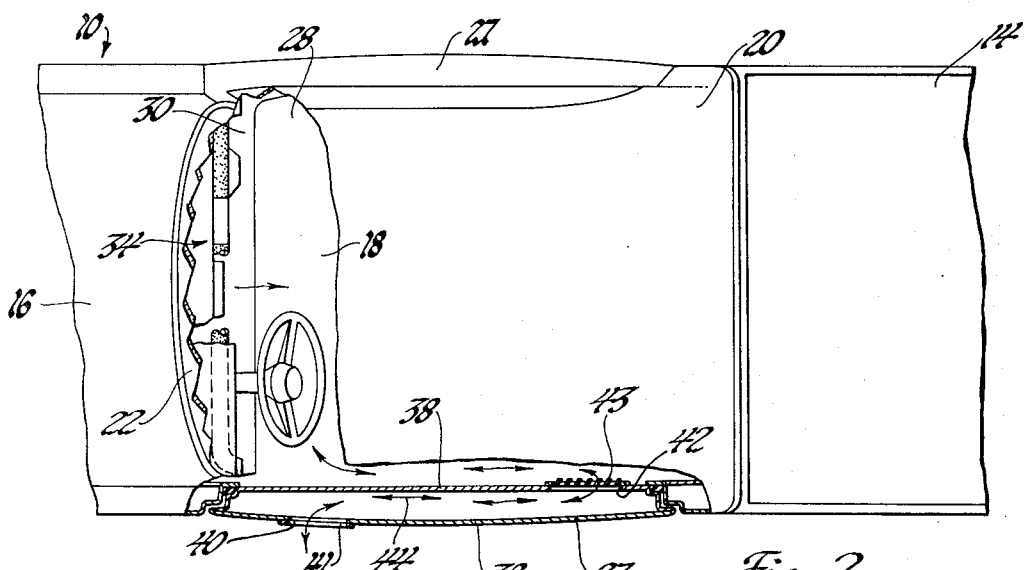
FIG. 2 is a horizontal top view of the vehicle broken away to reveal details of the air admission area and the unobstructed air passageway and opening in the neutral pressure area of the vehicle.

In FIGS. 1 and 2 of the drawing, a motor vehicle such as a truck is illustrated at 10. It is understood that the motor vehicle could also be a passenger car, or the like, or any similar vehicle. The vehicle includes a front end 12 and a rear end pick-up truck body 14. The front end 12 includes a hood 16 that covers the vehicle's engine (not shown). Between front end 12 and the rear end 14 is a passenger compartment 18. The passenger compartment 18 comprises a roof or top 20, a front windshield 22, backlight or rear window 24, a plurality of side windows 26, and doors 27. The side windows 26 can be opened at will be the vehicle's occupant(s). A front seat 28, as shown in FIG. 2, is attached to the floor 30 of the passenger compartment 18 for passenger seating.

The passenger compartment 18 is separated from the engine by a firewall 32, which supports an air admission system 34 for introducing air under pressure into the passenger compartment 18. The air admission system 34 may include a fan (not shown) which draws air from the atmosphere through grill inlets (not shown), which are conventional and are well known, and pumps the air into the passenger compartment 18. A heater core and evaporator core (neither visible) within the air admission system 34 conditions the air to achieve a predetermined temperature and humidity within the passenger compartment 18.

Door 27 of the vehicle, as best shown in FIG. 2, includes a spaced outer or exterior panel 36 and inner or interior panel 38, having exterior and interior surfaces, respectively. Panels 36 and 38 are joined together along their peripheries, as is conventional in making doors, by welding or other suitable means. An opening 40 extends through the exterior panel 36 and has a plurality of slots or louvers 41 spaced horizontally to cover the opening, as best seen in FIG. 2. The slots may be formed integrally with the door or may be part of a separate cover that fits over opening 40.

A similar second opening 42 having a plurality of integral slots or louvered grill 43 covers the second opening and extends through the inside surface portion of the inner panel 38 into the passenger compartment 18. A flow path 44 defined by the spaced panels 36 and 38 connects and provides communication between the opening 40 and opening 42. The openings 40, flow path 44, and the opening 42 connect the passenger compartment 18 with the atmosphere. This air passage conducts an uninhibited or unobstructed air flow in either direction between the passenger compartment 18 and the atmosphere. Uninhibited or unobstructed, as used in this application, refers to the absence of valving or similar unidirectional flow control means in the air passage. It is realized that a degree of resistance to air flow is inherent in any passage, and thus the use of the words uninhibited or unobstructed excludes this consideration.

The opening 40 extends vertically on door 27, as shown in FIG. 1, with the slots or louvers extending horizontally in relation to the door to cover the opening 40. In addition, opening 40 is located in a substantially neutral pressure area. The neutral pressure area as used in this application is the pressure on the outside of a given point on the vehicle that is at substantially an atmospheric or ambient pressure. The neutral pressure area is produced by air flow over the exterior surface of the vehicle 10 during vehicle movement. Positive, negative, and neutral areas on any given distinct type of vehicle, such as a truck or car, are experimentally determined by wind tunnel tests or road tests on such a vehicle or on a model of the vehicle. Obviously, different vehicle bodies have such pressure areas located in different areas. The opening 40 is located at a zero or neutral pressure area as determined experimentally, and occurs or is located between a positively pressurized surface area of the vehicle and a negatively pressurized surface area of the vehicle, or as close to the desired area and values as possible either on the slightly negative side, or slightly positive side if these are the best areas that can be achieved.

Figure 4:
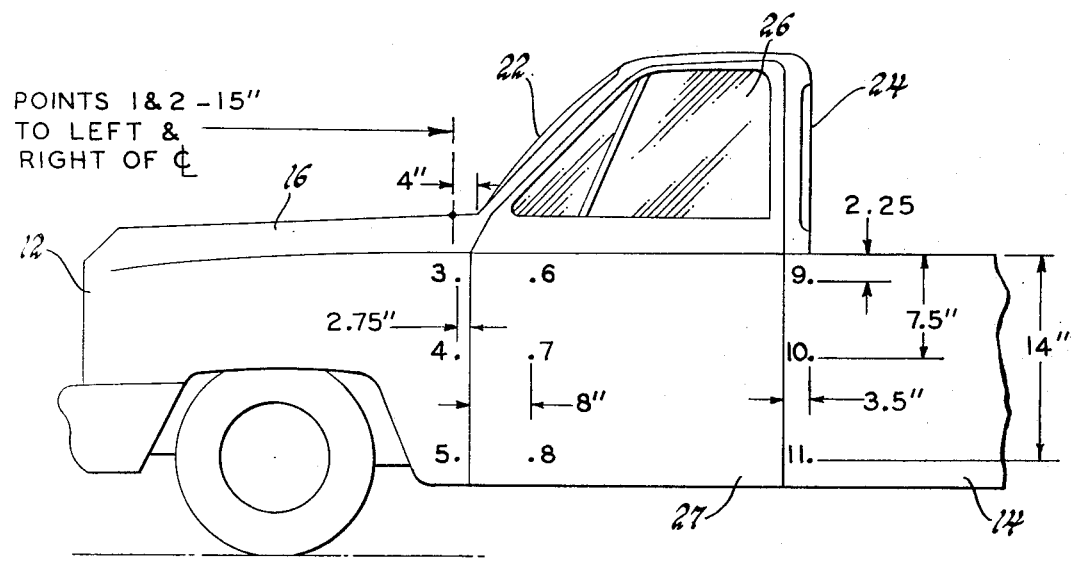
FIG. 4 is a vertical side view of the motor vehicle of FIG. 1 showing typical pressure areas measured and the values at each area.

As seen from the chart in FIG. 4, the areas measured on the vehicle at several different areas give different pressure readings as would be expected. For example, area 7 which was measured a distance of 8 inches from the forward edge of the door and down approximately 7.5 inches from the pick-up body 14 indicated a pressure of —0.2 inch of water at 50 miles per hour (mph). At point 8, measured the same distance from the door edge but approximately 14 inches below the pick-up body 14, measured a pressure of —0.1 inch of water at 50 mph. Point 8 therefore being closer to the neutral pressure area on the vehicle as measured at different speeds would be the best possible position in which to place opening 40. It is understood, that other similar low negative or positive or neutral areas may be found on the vehicle body where opening 40 could be placed. Generally the openings are located in the most advantageous position that will also be aesthetically pleasing.

In operation, when the side windows 26 of the vehicle 10 are closed, positive air pressure is built up within the passenger compartment 18 by the fan of the air admission means 34 which pumps air into the passenger compartment. Highly positive pressure levels in a passenger compartment are undesirable, desirable, since they tend to produce wind noises as air flows from the automobile past window and door moldings. The positive pressure level within the passenger compartment 18 caused by this introduction of air by a fan is partially dependent on vehicle speed. An increase in vehicle speed will increase the volume of air introduced and, consequently, increase the pressure level in the passenger compartment 18. When a ram air admission means is used, vehicle speed is an even greater determinative of the passenger compartment pressure level, because the faster one goes, the greater the pressure.

The ventilation system of my invention reduces high positive pressure levels in the passenger compartment by an exhaust flow through the opening 42, flow path 44, and through opening 40 to atmosphere. Since opening 40 is located in a neutral pressure area or area of least resistance to flow on the vehicle body, the positive pressure within passenger compartment 18 will cause air to flow from the passenger compartment 18 to atmosphere through opening 40. It has been observed that when a side window 26 of vehicle 10 is opened as much as approximately 6 inches, resultant air flow out the opened window tends to produce a negative pressure level in the passenger compartment 18 with respect to the pressure level of air flowing beneath floor 30 of the vehicle. The number of side windows lowered and the location of the windows with respect to other body portions affects the degree of negative pressure developed in the passenger compartment 18. Normally, a negative pressure level is experienced with the side windows lowered. The ventilation system of my invention reduces high negative pressure levels by a back flow of air from the atmosphere through opening 40, flow path 44, and through opening 42 into the passenger compartment 18. Because the opening 40 is located in a neutral pressure area on the vehicle body, the negative pressure in the passenger compartment 18 causes air to flow from the atmosphere through the air passage into the passenger compartment 18, which is now an area of less than the neutral pressure. This maintains the passenger compartment 18 at a pressure level more positive than would otherwise be the case. The effects of the present ventilation system have been determined by measurement of air pressure within the passenger compartment 18 during vehicle movement.

Figure 3:
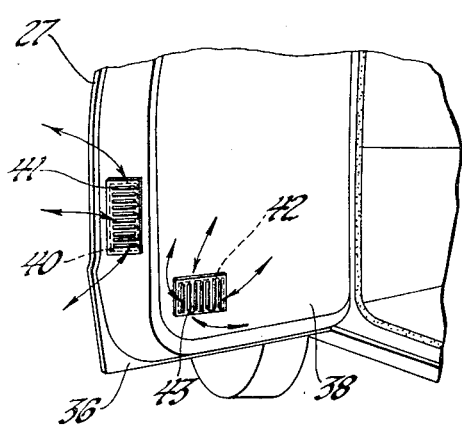
FIG. 3 is a view of a second embodiment of the invention showing the neutral area opening in the edge or door lock face of the door.

FIG. 3 shows a modifiation of the invention wherein the opening to the exterior of the vehicle is located in a neutral area on the door lock face, instead of on the side of the vehicle, as shown in FIG. 1. The operation and results are similar to those achieved by the embodiment shown in FIG. 1. The reason for placement of the opening in the door lock face is to conceal the same, as well as preclude weather elements, such as snow and sleet, from obstructing the opening. Any water or condensation that might be introduced into the flow path area of either embodiment is drained through the bottom of the door through drain plugs.

While the embodiment of the present invention as herein described constitutes a preferred form, it is to be understood that other forms may be adopted.

I claim:

1. A motor vehicle having a ventilation system adapted to decrease passenger compartment air noise, and to maintain passenger compartment pressures at more nearly ambient conditions comprising a passenger compartment having side doors with operative windows; air admission means for introducing air under pressure into the forward portion of said passenger compartment; an unobstructed air passage having one end open to atmosphere in a substantially neutral pressure area located between a high pressure area and a low pressure area on the exterior surface of the vehicle door with the neutral pressure area being established by air flow over the exterior surface during vehicle movement; the other end of said air passage also having an unobstructed opening into said passenger compartment on the interior surface of the vehicle door rearwardly of the air passage opening on the exterior surface of the door, with said air passage openings thereby being offset to allow free flow of air in either direction into or out of the passenger compartment through the air passage with the flow of air being through said air passage into said passenger compartment from the outside of the vehicle when the window is opened, to effectively reduce the negative air pressure within said passenger compartment; and the flow of air being out of said passenger compartment through said air passage to the outside of said vehicle to effectively reduce the positive air pressure within said passenger compartment upon closing the side window and said air admission means is activated.

* * * * *